A. I. JONES.
WEED EXTERMINATOR AND CULTIVATOR.
APPLICATION FILED NOV. 21, 1908.
918,677.
Patented Apr. 20, 1909.
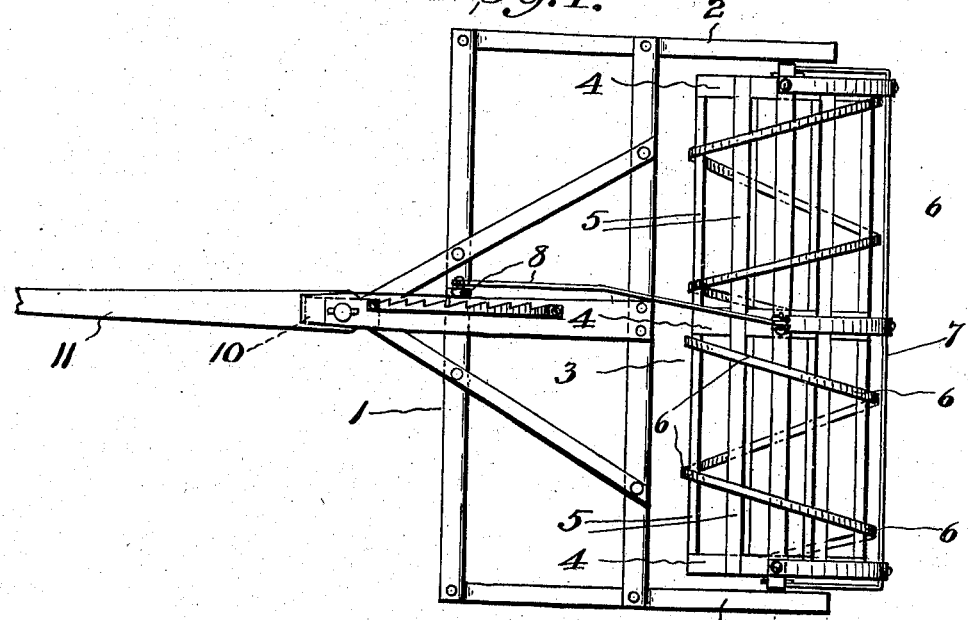
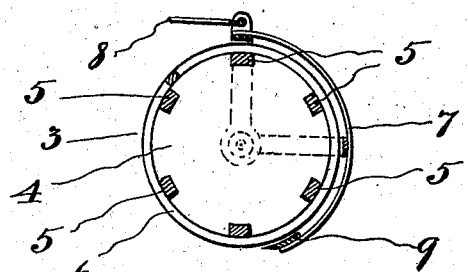
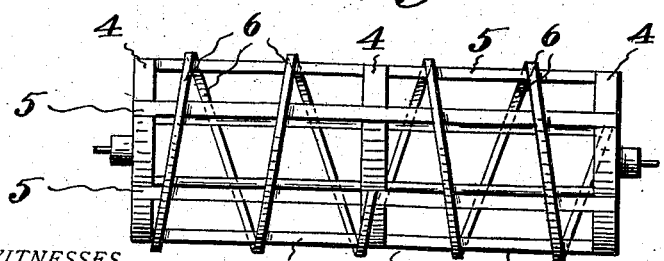
WITNESSES
INVENTOR:

UNITED STATES PATENT OFFICE.

ALBERT I. JONES, OF RITZVILLE, WASHINGTON.

WEED-EXTERMINATOR AND CULTIVATOR.

No. 918,677.  Specification of Letters Patent.  Patented April 20, 1909.

Application filed November 21, 1908. Serial No. 463,753.

*To all whom it may concern:*

Be it known that I, ALBERT I. JONES, a citizen of the United States, and a resident of Ritzville, in the county of Adams and State of Washington, have invented certain new and useful Improvements in Weed-Exterminators and Cultivators, of which the following is a specification.

My invention relates to devices for cultivating land and exterminating weeds therein, and has for its object the provision of a rotating cylinder having a metal band secured thereto and helically wound thereon and a frame having a knife-blade secured to its lower edge and engaging said band, the weight of the cylinder and band being sufficient when the knife-frame is in an operative position to sink the knife under the surface of the soil to cut out the weeds and grass, the band serving to scrape the blade free of any heavy stubble or large weeds that the knife cannot cut.

The construction and operation of my improved weed exterminator will be described hereinafter and illustrated in the accompanying drawings, in which—

Figure 1 is a top view of my improved machine with the cutting frame in an operative position; Fig. 2, a view of the rotating cylinder; and Fig. 3, a cross-section of the cylinder and cutting frame.

In the drawings similar reference characters indicate corresponding parts in all of the views.

1 indicates the main frame of my improved device having rearwardly-extending arms 2, between which is journaled the cylinder 3, consisting of disks 4 and slats 5, secured thereto.

6 indicates two bands of metal secured together and to the middle of the cylinder and helically wound on slats 5 to the two ends of the cylinder and firmly secured thereto.

7 indicates a semicylindrical frame, pivotally secured to the trunnions of the cylinder 3, and actuated by means of a lever 8, fulcrumed on frame 1, and having a knife-blade 9 secured to its rear end, so that when the frame 7 is swung so that the knife-blade 9 swings downwardly it sinks into the soil beneath the cylinder 3 and cuts out the roots of weeds, grass, etc., the helical bands 6, because of the rotation of the cylinder 3 when the frame is drawn in a forward direction, rubbing against the edge of the blade 9, serving to clear it of any heavy weeds, grass roots, stubble, etc., that the blade cannot cut through.

10 indicates a wheel or roller to support the front of frame 1, and 11 the draft-pole to pull the machine.

Having thus described my invention, what I claim is—

1. In a cultivator and weed exterminator, a rotating cylinder, a frame suitably secured around said cylinder, a knife-blade secured to said frame, and bands secured to the surface of said cylinder and wound helically thereon, said bands engaging said knife-blade, substantially as shown and described.

2. In a cultivator and weed exterminator, a rotating cylinder, bands secured to the surface of said cylinder and wound helically thereon, a frame pivotally mounted and swinging around said cylinder, and a knife blade secured to said frame, substantially as shown and described.

3. In a cultivator and weed exterminator, a frame, a cylinder journaled on said frame, bands secured to the surface of said cylinder and wound helically thereon, a semicylindrical frame pivotally secured and swinging around said cylinder, a lever fulcrumed on the first-mentioned frame and secured to the semicylindrical frame, and a knife-blade secured to the semicylindrical frame and engaging the edges of the helical bands aforesaid, substantially as shown and described.

In witness whereof, I have hereunto set my hand in presence of two subscribing witnesses.

ALBERT I. JONES.

Witnesses:
OTTO W. NAEF,
FLORA M. COOK.